United States Patent
Tai et al.

(10) Patent No.: US 12,110,429 B2
(45) Date of Patent: Oct. 8, 2024

(54) HOT MELT PROCESSABLE ADHESIVE WITH IONIC CROSSLINKERS

(71) Applicant: 3M INNOVATIVE PROPERTIES COMPANY, St. Paul, MN (US)

(72) Inventors: Huiwen Tai, Lake Elmo, MN (US); John A. Nielsen, Woodbury, MN (US); Anish Kurian, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 129 days.

(21) Appl. No.: 17/919,719

(22) PCT Filed: Apr. 28, 2021

(86) PCT No.: PCT/IB2021/053548
§ 371 (c)(1),
(2) Date: Oct. 18, 2022

(87) PCT Pub. No.: WO2021/220200
PCT Pub. Date: Nov. 4, 2021

(65) Prior Publication Data
US 2023/0167334 A1  Jun. 1, 2023

Related U.S. Application Data

(60) Provisional application No. 62/704,232, filed on Apr. 29, 2020.

(51) Int. Cl.
*C09J 7/35* (2018.01)
*C09J 11/06* (2006.01)
*C09J 133/10* (2006.01)

(52) U.S. Cl.
CPC .......... *C09J 7/35* (2018.01); *C09J 11/06* (2013.01); *C09J 133/10* (2013.01); *C09J 2301/304* (2020.08); *C09J 2301/312* (2020.08); *C09J 2301/408* (2020.08); *C09J 2301/414* (2020.08); *C09J 2400/226* (2013.01)

(58) Field of Classification Search
CPC ............ B32B 2250/24; B32B 2270/00; B32B 2307/412; B32B 2307/7163; B32B 2405/00; B32B 27/08; B32B 27/304; B32B 27/306; B32B 27/308; B32B 27/32; B32B 27/36; B32B 7/06; B32B 7/12; C08F 220/1808; C08F 265/06; C09J 11/06; C09J 133/10; C09J 151/003; C09J 2301/304; C09J 2301/312; C09J 2301/408; C09J 2301/414; C09J 2400/226; C09J 2433/00; C09J 4/06; C09J 5/06; C09J 7/35
USPC ............. 156/60, 156, 229, 242, 243, 244.11, 156/244.13, 244.14, 296, 325, 326, 327, 156/332; 524/399; 428/516; 525/370, 525/330.6

See application file for complete search history.

(56) References Cited

U.S. PATENT DOCUMENTS

| | | |
|---|---|---|
| 3,740,366 A | 6/1973 | Sanderson et al. |
| 4,354,008 A | 10/1982 | Skoultchi |
| 4,423,182 A | 12/1983 | Bartman |
| 4,851,278 A | 7/1989 | Enanoza |
| 5,252,662 A | 10/1993 | Su et al. |
| 5,804,610 A | 9/1998 | Hamer et al. |
| 7,888,432 B2 | 2/2011 | Voorheis |
| 7,968,661 B2 | 6/2011 | Ellis et al. |
| 8,969,456 B2 | 3/2015 | Satrijo et al. |
| 2005/0074622 A1 | 4/2005 | Vogel et al. |
| 2007/0054969 A1 | 3/2007 | Bailey et al. |
| 2009/0004493 A1 | 1/2009 | Maier et al. |
| 2013/0184394 A1 | 7/2013 | Satrijo et al. |

FOREIGN PATENT DOCUMENTS

| | | |
|---|---|---|
| EP | 0259968 B1 | 2/1993 |
| JP | 09104845 A | 4/1997 |

OTHER PUBLICATIONS

"Comprehensive Varox® Peroxide Accelerator", Product Guide, Vanderbilt Chemicals, LLC, 2014, pp. 1-32.
"Dymalink™ Metallic Coagents", Cray Valley, Hydrocarbon Specialty Chemicals, 2011, pp. 1-10.
Ceska, "Hybrid Oligomers Organic/Inorganic Acrylics", Internet Citation, 2005, pp. 1-4, XP002588387.
Henning, "Fundamentals of Curing Elastomers with Peroxides and Coagents I: Coagent Structure—Property Relationships", 2005, pp. 1-18.
International Search Report for PCT International Application No. PCT/IB2021/053548, mailed on Sep. 23, 2021, 5 pages.
Lu, "Study On Mechanical Properties of Elastomers Reinforced By Zinc Dimethacrylate", European Polymer Journal, 2005, vol. 41, pp. 589-598.

*Primary Examiner* — Philip C Tucker
*Assistant Examiner* — Brian R Slawski
(74) *Attorney, Agent, or Firm* — Jeffrey M. Olofson

(57) ABSTRACT

Hot melt processable composition mixtures include an acid-functional (meth)acrylate-based adhesive composition and a zinc di-(meth)acrylate salt. The adhesive composition has a hot melt processing temperature, and the zinc salt has a melting point that is higher than the hot melt processing temperature of the adhesive composition. The mixture is hot melt processable, and upon application to a substrate, the mixture forms an ionically crosslinked layer with thermally reversable ionic crosslinks.

19 Claims, No Drawings

HOT MELT PROCESSABLE ADHESIVE WITH IONIC CROSSLINKERS

FIELD OF THE DISCLOSURE

The current disclosure relates to hot melt processable adhesive compositions with ionic crosslinkers.

BACKGROUND

Adhesives have been used for a variety of marking, holding, protecting, sealing and masking purposes. Adhesive tapes generally comprise a backing, or substrate, and an adhesive. One type of adhesive, a pressure-sensitive adhesive, is particularly useful for many applications.

Pressure-sensitive adhesives are well known to one of ordinary skill in the art to possess certain properties at room temperature including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as pressure-sensitive adhesives are polymers designed and formulated to exhibit the requisite viscoelastic properties resulting in a desired balance of tack, peel adhesion, and shear strength. The most commonly used polymers for preparation of pressure-sensitive adhesives are natural rubber, synthetic rubbers (e.g., styrene/butadiene copolymers (SBR) and styrene/isoprene/styrene (SIS) block copolymers), various (meth)acrylate (e.g., acrylate and methacrylate) copolymers and silicones. Each of these classes of materials has advantages and disadvantages.

SUMMARY

The current disclosure relates to hot melt processable adhesive compositions with ionic crosslinkers, multi-layer articles prepared with the hot melt processable adhesive compositions, and methods of preparing these multi-layer articles.

In some embodiments, the hot melt processable composition mixture comprises an acid-functional (meth)acrylate-based adhesive composition with a hot melt processing temperature, and a zinc di-(meth)acrylate salt with a melting point wherein the melting point is higher than the hot melt processing temperature of the acid-functional (meth)acrylate-based adhesive composition. The mixture is hot melt processable, and upon application to a substrate, the mixture forms an ionically crosslinked layer comprising thermally reversable ionic crosslinks.

Also disclosed are multi-layer articles. In some embodiments, the multi-layer articles comprise a first polymeric layer with a first major surface and a second major surface, a hot melt processed, ionically crosslinked adhesive layer with a first major surface and a second major surface where the first major surface of the adhesive layer is in contact with the second major surface of the first polymeric layer, and a second polymeric layer with a first major surface and a second major surface, where the first major surface of the second polymeric layer is in contact with the second major surface of the hot melt processed, ionically crosslinked adhesive layer. The hot melt processed, ionically crosslinked adhesive layer is the hot melt processable mixture described above that has been hot melt processed.

Also disclosed are methods of forming a multi-layer article comprising forming a hot melt processable adhesive mixture as described above, hot melt mixing the hot melt processable composition mixture to form a flowable composition, disposing the flowable composition onto the surface of a first film substrate, disposing a second film substrate on the surface of the adhesive composition to form a multi-layer flowable composition, where the second film substrate comprises a coextruded flowable polymeric composition, and cooling the multi-layer composition to room temperature to form a multi-layer article with an ionically crosslinked adhesive layer. In some embodiments, the the first film substrate comprises a coextruded flowable polymeric composition.

DETAILED DESCRIPTION

Adhesives have been used for a variety of marking, holding, protecting, sealing and masking purposes. Among articles prepared with layers of adhesive are adhesive tapes that generally comprise a backing, or substrate, and an adhesive layer. Other adhesive articles are multi-layer articles that comprise a layer of adhesive between two substrates.

The use of hot melt processing to prepare adhesive articles has led to the need for hot melt processable adhesive compositions. In many embodiments, the adhesives are hot melt coated onto a substrate layer or the adhesive layer and the substrate layer are co-extruded to form an adhesive article in a single step. Among the hot melt processable adhesives prepared for these articles include pressure sensitive adhesives prepared in a package as described in U.S. Pat. No. 5,804,610 (Hamer et al.).

In some hot melt processed adhesive articles, rather than disposing an adhesive layer on a substrate layer, adhesive layers are coextruded with multiple polymeric layers. In these articles, the coextruded adhesive layers are typically present between polymeric layers and function to adhere the polymeric layers together.

These coextrusion processes require adhesive layers that have flow properties that match with the polymeric layers with which the adhesive layers are coextruded. If there is a mismatch in the flow properties, problems are encountered in the coextrusion process. Among the coextrusion processes are melt blowing processes where an adhesive layer is coextruded with one or more polymeric layers. Melt blowing is a conventional fabrication method where a polymer melt is extruded through small nozzles surrounded by high speed blowing gas.

Blown film extrusion is a technology that is the most common method to make plastic films, especially for the packaging industry. The process involves extruding a tube of molten polymer through a die and inflating to several times its initial diameter to form a thin film bubble. This bubble is then collapsed and used as a lay-flat film or can be made into bags.

One way to improve the line efficiency of extrusion, including blown film extrusion, is to implement coextrusion. This is the process of extruding two or more materials simultaneously through a single die. The orifices in the die are arranged such that the layers merge together before cooling. This process saves time because it extrudes two or more layers at the same time, and it provides a method to produce multi-layer films using fewer steps.

It has been found that coextruding adhesive layers along with other polymeric layers can be problematic since adhesive polymers often have different rheological properties from other polymeric materials. Additionally, it is often desirable to crosslink the adhesive layer after the coextrusion to improve the cohesive strength of the adhesive layer and to strongly adhere together the layers to which the adhesive is attached.

Typically, post-extrusion crosslinking is carried out by non-thermal crosslinking methods such as photocrosslinking or e-beam crosslinking. In photocrosslinking, a thermally insensitive photo-activatable crosslinker is included in the polymeric composition and is activated by light, typically UV light. This approach is less desirable for multi-layer coextruded articles, since it adds another step to processing (UV curing) and the UV light needs to pass through any coextruded polymeric layers in order to reach the adhesive layer. Additionally, polymeric layers may be sensitive to UV radiation such that curing may damage these polymeric layers, or the polymeric layers may contain UV absorbers or stabilizers and thus may be essentially opaque to UV radiation. The use of UV curing is especially unsuitable in the case of melt-blown films, as they are melt-blown immediately after coextrusion and the melt-blowing process greatly increases the width of the formed film requiring large UV lamps to effect the crosslinking. In e-beam crosslinking, the adhesive layer is exposed to an electron beam. The electron beam causes chain scission, which forms free radical groups that effect the crosslinking. An advantage of e-beam crosslinking is that no initiator is required. The drawbacks are similar to those for photocrosslinking described above, but it is typically not possible to crosslink an adhesive layer that is an intermediate layer, since the electron beam will also crosslink or otherwise affect the polymeric layers adjacent to the adhesive layer.

Therefore, a crosslinking agent that is thermally insensitive so that it can undergo hot melt processing, and does not require activation, such as activation by UV light or an e-beam is desirable. What is disclosed herein are hot melt processable adhesive compositions that contain ionic crosslinking agents that do not form crosslinks at elevated temperatures but upon cooling spontaneously form crosslinks. These crosslinking agents are metal salts. Surprisingly, it has been found that the metal salt crosslinking agents are able to function as crosslinking agents despite the fact that the melting point of the crosslinking agent is higher than the hot melt processing temperature. Thus, even though the crosslinking agents do not melt at the processing temperature of the adhesive blend, they dissolve into the adhesive blend and function as crosslinking agents. It has further been discovered that not all metal salts are suitable ionic crosslinkers.

Often it is desirable that the adhesive layer have desirable optical properties. Generally, the adhesive layer is optically transparent, and may even be optically clear. These optical properties can be adversely affected in a variety of ways. If the flow properties of the adhesive layer differ from the polymeric materials with which it is coextruded, the formed film can have optical defects as a result of the processing. Additionally, adding a solid material to a hot melt blend that does not melt at the blend temperature might be expected to cause optical defects such as clumps of solid in the formed layer. However, as has been described above, even though the solid crosslinking agent does not melt at the hot melt processing temperature, the resultant adhesive layer is optically transparent.

Disclosed herein are hot melt processable composition mixtures comprising an acid-functional (meth)acrylate-based adhesive composition with a hot melt processing temperature, and a zinc di-(meth)acrylate salt with a melting point that is higher than the hot melt processing temperature of the acid-functional (meth)acrylate-based adhesive composition. The mixture is hot melt processable, and upon application to a substrate the mixture forms an ionically crosslinked layer comprising thermally reversable ionic crosslinks.

Also disclosed are multi-layer articles comprising a first hot melt processable polymeric layer with a first major surface and a second major surface, a hot melt processable, ionically crosslinked adhesive layer with a first major surface and a second major surface where the first major surface of the adhesive layer is in contact with the second major surface of the first hot melt processable polymeric layer, and a second hot melt processable polymeric layer with a first major surface and a second major surface, where the first major surface of the second hot melt processable polymeric layer is in contact with the second major surface of the adhesive layer. The adhesive layer is a hot melt processable, ionically crosslinked adhesive layer as has been described above.

Methods of forming multi-layer articles are also disclosed. In some embodiments, the method comprises forming a hot melt processable adhesive mixture, hot melt mixing the hot melt processable composition mixture to form a flowable composition, disposing the flowable composition onto the surface of a first film substrate, where the first film substrate comprises a coextruded flowable polymeric composition, disposing a second film substrate on the surface of the adhesive composition, where the second film substrate comprises a coextruded flowable polymeric composition, thus forming a multi-layer flowable composition. In some embodiments, the multi-layer flowable composition is melt-blown to form a multi-layer melt-blown composition, and then the multi-layer melt-blown composition is cooled to room temperature to form a multi-layer article with an ionically crosslinked adhesive layer. The hot melt processable adhesive mixture is the mixture described above, comprising an acid-functional (meth)acrylate-based adhesive composition with a hot melt processing temperature, and a zinc di-(meth)acrylate salt with a melting point that is higher than the hot melt processing temperature of the acid-functional (meth)acrylate-based adhesive composition.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

The term "adhesive" as used herein refers to polymeric compositions useful to adhere together two adherends. Examples of adhesives are pressure sensitive adhesives.

Pressure sensitive adhesive compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

The term "(meth)acrylate" refers to monomeric acrylic or methacrylic esters of alcohols. Acrylate and methacrylate monomers or oligomers are referred to collectively herein as "(meth)acrylates". Materials referred to as "(meth)acrylate functional" are materials that contain one or more (meth) acrylate groups.

The terms "room temperature" and "ambient temperature" are used interchangeably to mean temperatures in the range of 20° C. to 25° C.

The terms "Tg" and "glass transition temperature" are used interchangeably. If measured, Tg values are determined by Differential Scanning Calorimetry (DSC) at a scan rate of 10° C./minute, unless otherwise indicated. Typically, Tg values for copolymers are not measured but are calculated using the well-known Fox Equation, using the homopolymer Tg values provided by the monomer supplier, as is understood by one of skill in the art.

The term "adjacent" as used herein when referring to two layers means that the two layers are in proximity with one another with no intervening open space between them. They may be in direct contact with one another (e.g. laminated together) or there may be intervening layers.

The term "hot melt processable" as used herein, when referring to a material of a mixture, means that the material is capable of hot melt mixing without degrading the material or materials, using for example a hot melt mixer or an extruder. This is a material limitation and not a process limitation, as a material described as hot melt processable merely means that it is capable of being hot melt processed and does not mean that it has been hot melt processed. The term "hot melt processed" as used herein refers to a material or mixture that has been hot melt processed. In the case of the ionically crosslinked adhesives, being hot melt processed means that the adhesive has been hot melt mixed, disposed and allowed to cool to form an ionically crosslinked adhesive layer. However, since the ionic crosslinks are thermally sensitive, the adhesive layer is also typically hot melt processable.

The terms "polymer" and "macromolecule" are used herein consistent with their common usage in chemistry. Polymers and macromolecules are composed of many repeated subunits. As used herein, the term "macromolecule" is used to describe a group attached to a monomer that has multiple repeating units. The term "polymer" is used to describe the resultant material formed from a polymerization reaction.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

Unless otherwise indicated, the terms "optically transparent", and "visible light transmissive" are used interchangeably, and refer to an article, film or adhesive that has a high light transmittance over at least a portion of the visible light spectrum (about 400 to about 700 nm). Typically, optically transparent articles have a visible light transmittance of at least 90% and a haze of less than 10%.

Unless otherwise indicated, "optically clear" refers to an adhesive or article that has a high light transmittance over at least a portion of the visible light spectrum (about 400 to about 700 nm), and that exhibits low haze, typically less than about 5%, or even less than about 2%. In some embodiments, optically clear articles exhibit a haze of less than 1% at a thickness of 50 micrometers or even 0.5% at a thickness of 50 micrometers. Typically, optically clear articles have a visible light transmittance of at least 95%, often higher such as 97%, 98% or even 99% or higher.

Disclosed herein are hot melt processable composition mixtures that form crosslinked adhesive layers. In some embodiments, the crosslinked adhesive layer is a pressure sensitive adhesive. In some embodiments the crosslinked adhesive layer is optically transparent. The crosslinked adhesive layer is particularly suitable in adhering together co-extruded polymeric layers.

In some embodiments, the hot melt processable composition mixture comprises an acid-functional (meth)acrylate-based adhesive composition with a hot melt processing temperature, and a zinc di-(meth)acrylate salt with a melting point, where the melting point is higher than the hot melt processing temperature of the acid-functional (meth)acrylate-based adhesive composition. The mixture is hot melt processable, and upon application to a substrate the mixture forms an ionically crosslinked layer comprising thermally reversable ionic crosslinks.

A wide range of acid-functional (meth)acrylate-based adhesive compositions are suitable for use in the hot melt processable mixture. Particularly desirable (meth)acrylate-based adhesive compositions are (meth)acrylate copolymers derived from: (A) at least one monoethylenically unsaturated alkyl (meth) acrylate monomer (i.e., alkyl acrylate and alkyl methacrylate monomer); and (B) at least one monoethylenically unsaturated free-radically copolymerizable acid-functional monomer. The acid-functional monomer has a homopolymer glass transition temperature (Tg) higher than that of the alkyl (meth)acrylate monomer and increases the glass transition temperature and cohesive strength of the resultant copolymer. Monomers A and B are chosen such that a copolymer formed from them is extrudable. Herein, "copolymer" refers to polymers containing two or more different monomers, including terpolymers, tetrapolymers, etc.

Monomer A, which is a monoethylenically unsaturated alkyl acrylate or methacrylate (i.e., (meth)acrylic acid ester), contributes to the flexibility and tack of the copolymer. Generally, monomer A has a homopolymer Tg of no greater than about 0° C. Typically, the alkyl group of the (meth) acrylate has an average of about 1 to about 20 carbon atoms, and more generally, an average of about 1 to about 14 carbon atoms. The alkyl group can optionally contain oxygen atoms in the chain thereby forming ethers or alkoxy ethers, for example. Examples of monomer A include, but are not limited to, methyl acrylate, ethyl acrylate, 2-methylbutyl acrylate, isooctyl acrylate, lauryl acrylate, 4-methyl-2-pentyl acrylate, isoamyl acrylate, sec-butyl acrylate, n-butyl acrylate, n-hexyl acrylate, 2-ethylhexyl acrylate, n-octyl acrylate, n- decyl acrylate, isodecyl acrylate, isodecyl methacrylate, and isononyl acrylate. Other examples include, but are not limited to, poly-ethoxylated or -propoxylated methoxy (meth)acrylates such as acrylates of CARBOWAX (commercially available from Union Carbide) and NK ester AM90G (commercially available from Shin Nakamura Chemical, Ltd., Japan). Particularly suitable monoethylenically unsaturated (meth)acrylates that can be used as monomer A include isooctyl acrylate, 2-ethyl-hexyl acrylate, and n-butyl acrylate. Combinations of various monomers categorized as an A monomer can be used to make the copolymer of this disclosure. In some embodiments, a combination of isooctyl acrylate and methyl acrylate is used.

Monomer B, which is a monoethylenically unsaturated free-radically copolymerizable reinforcing acid-functional monomer. Examples of suitable materials for monomer B include acrylic acid, methacrylic acid, itaconic acid, crotonic acid, maleic acid, fumaric acid. A particularly suitable monomer B is acrylic acid.

Generally, the (meth)acrylate copolymer is formulated to have a resultant Tg of less than about 25° C. and more typically, less than about 0° C. Such acrylate copolymers typically include about 60 parts to about 99 parts per hundred of at least one monomer A and about 1 parts to about 40 parts per hundred of at least one monomer B. In some embodiments, the (meth)acrylate copolymers have about 85 parts to about 99 parts per hundred or a mixture of A monomers and about 1 part to about 15 parts of at least one monomer B.

The (meth)acrylate copolymer can be prepared by a variety of different polymerization methods. Among the polymerization techniques include solvent borne polymerization, waterborne polymerization, or 100% solids polymerization. Among the 100% solids polymerization methods are bulk polymerization methods and polymerization in a package. All of these methods are well known in the polymer arts.

In some embodiments, the (meth)acrylate copolymer is prepared in a multiple step bulk process such as that described in U.S. Pat. No. 7,968,661 (Ellis, et al.). In other embodiments, the (meth)acrylate copolymer is prepared in a thermoplastic package. This method is particularly suitable for hot melt processing, as the packages can be fed into a hot melt processing apparatus such as an extruder, and hot melt blended. Methods for preparing hot melt processable packaged adhesive compositions are described in U.S. Pat. No. 5,804,610 (Hamer et al.). The hot melt processable packaged adhesive compositions of this disclosure comprise a crosslinkable (meth)acrylate copolymer formed from a polymerizable pre-adhesive reaction mixture, and a packaging material. The pre-adhesive reaction mixture typically comprises, at least one alkyl (meth)acrylate monomer, a co-polymerizable acid-functional monomer, and at least one initiator. Suitable alkyl (meth)acrylate monomers and co-polymerizable acid-functional monomers are described above.

As mentioned above, the acid-functional (meth)acrylate-based adhesive composition has a hot melt processing temperature that is less than the melting point of the ionic crosslinkers described below. In some embodiments, the hot melt processing temperature is less than 200° C. In some embodiments, the hot melt processing temperature is about 180° C.

The hot melt processable composition also includes at least one ionic crosslinker, where the ionic crosslinker is a zinc salt. It has been found that not all zinc salts are suitable. For example, zinc salts such as zinc acetate, zinc oxide, and zinc stearate have been found to be unsuitable. In the present disclosure, the ionic crosslinker comprises a zinc di-(meth)acrylate salt. The ionic crosslinker has a melting point that is less than the hot melt processing temperature of the acid-functional (meth)acrylate-based adhesive composition. In some embodiments, the ionic crosslinker has a melting point greater than 200° C.

In some embodiments, the zinc salt is a di-(meth)acrylate salt comprises a salt of Formula 1:

$$[Zn^{2+}][^-O\text{---}(CO)\text{---}CR^1\text{=}CH_2]_2 \quad \text{Formula 1}$$

wherein $R^1$ is an H or a methyl group; —(CO)— is a carbonyl group C=O.

The level of ionic crosslinker present in the hot melt processable composition can vary over a wide range depending upon the desired properties. In some embodiments, the hot melt processable composition comprises 0.75-5.0% by weight of the total composition of zinc di-(meth)acrylate salt.

The hot melt processable composition may further comprise at least one optional additive. In some embodiments, the additive comprises particles of thermoplastic material. These particles of thermoplastic material are the residual packaging material of packaged compositions of the (meth)acrylate-based adhesive composition that have been hot melt processed. Thus, if a packaged (meth)acrylate-based adhesive composition is used, at least some particles of thermoplastic packaging material will be present in the hot melt processed composition.

A wide array of other optional additives is suitable as long as the additives do not interfere with the desired properties of the hot melt processed composition. Examples of suitable optional additives include tackifiers, fillers, or pigments.

The hot melt processed ionically crosslinked adhesive composition layer has a range of desirable properties. In some embodiments, the adhesive layer is optically transparent, or even optically clear. In some embodiments, the optical transparency is measured visually by the ability to see through the layer. In other embodiments, the optical properties can be measured with a spectrophotometer. In some embodiments, the optically transparent layer has a luminous visible light transmission of at least 80%, and a haze of less than 10%.

Additionally, the ionically crosslinked adhesive composition layer has a desirable tan delta (or Tan δ) value. This property can be measured using a rheometer. The rheometer measures Tan δ, where Tan δ is the tangent of the phase angle and the ratio of G"/G'. The Tan δ value is a measure of the crosslinking level of the adhesive at the given temperature. A lower Tan δ value indicates a higher crosslink density and a higher cohesive strength for the adhesive. In some embodiments, the ionically crosslinked adhesive composition layer has a Tan δ at 100° C., of less than 0.8. In some embodiments, the Tan δ is 0.3-0.6.

Also disclosed are multi-layer articles, where the multi-layer articles include at least one layer that is a hot melt processed layer as described above. In some embodiments, the multi-layer article comprises a first polymeric layer, a hot melt processed, ionically crosslinked adhesive layer, and a second polymeric layer. The hot melt processed, ionically crosslinked adhesive layer is a hot melt processable layer, meaning that the ionic crosslinks are thermally reversable. The first polymeric layer has a first major surface and a second major surface, the hot melt processed, ionically crosslinked adhesive layer has a first major surface and a second major surface, where the first major surface of the adhesive layer is in contact with the second major surface of the first polymeric layer. The second polymeric layer has a first major surface and a second major surface, where the first major surface of the second polymeric layer is in contact with the second major surface of the adhesive layer. The hot melt processed, ionically crosslinked adhesive layer comprises an acid-functional (meth)acrylate-based adhesive composition with a hot melt processing temperature, and a zinc di-(meth)acrylate salt with a melting point wherein the melting point is higher than the hot melt processing temperature of the acid-functional (meth)acrylate-based adhesive composition. The hot melt processed ionically crosslinked adhesive layer has been described in detail above. In some embodiments, the first and second polymeric layers are hot melt processable layers and the multi-layer article is prepared by coextrusion.

A wide range of materials are suitable for the first polymeric layer and the second polymeric layer. In some embodiments, the first and second polymeric layers are the same, in other embodiments, the first and second polymeric layers are different.

In some embodiments, at least one of the second major surface of the first polymeric layer and the first major surface of the second polymeric layer is a release surface. Examples of polymeric layers with a release surface are release liners. Release liners are sheet materials that have a low adhesion coating on at least one surface. In particular, release liners can be used to prepare multi-layer adhesive articles that can be used to prepare other adhesive articles. The hot melt processable adhesives of the present disclosure can be disposed on a release liner to generate an article comprising a layer of adhesive on a release liner. This adhesive/release liner article can be used to prepare other adhesive/substrate articles by laminating the adhesive layer to a different substrate and then removing the release liner. This permits the adhesive to be disposed onto substrates to which it is difficult to directly dispose the hot melt processable adhesive, such as substrates that are thermally sensitive.

In many embodiments, the first and second polymeric layers are co-extruded with the hot melt processable adhesive. In these embodiments, it has been found that the hot melt processable adhesive has desirable flow properties that permit coextrusion with a wide range of polymeric layers.

A wide range of co-extrudable polymeric materials can be used to form the first and second polymeric layers. Examples of suitable polymers include Ehtylene-vinyl acetate (EVA), ionomeric copolymers of ethylene and methacrylic acid, polyolefins such as polyethylene, polypropylene and copolymers or blends thereof, polyvinyl chloride (PVC), polylactic acid (PLA), and combinations thereof.

Also disclosed are methods for preparing multi-layer articles. The multi-layer articles are typically prepared by co-extrusion. In some embodiments, the method of forming a multi-layer article comprises forming a hot melt processable adhesive mixture, hot melt mixing the hot melt processable composition mixture to form a flowable composition, disposing the flowable composition onto the surface of a first film substrate, disposing a second film substrate that is a coextruded flowable polymer composition on the surface of the adhesive composition to form a multi-layer flowable composition, and cooling the multi-layer composition to room temperature to form a multi-layer article with an ionically crosslinked adhesive layer. In some embodiments, the first film substrate is also a coextruded flowable polymer composition. The hot melt processable adhesive mixture comprises an acid-functional (meth)acrylate-based adhesive composition with a hot melt processing temperature, and a zinc di-(meth)acrylate salt with a melting point that is higher than the hot melt processing temperature of the acid-functional (meth)acrylate-based adhesive composition, as described in detail above. In some embodiments, the multi-layer flowable composition is melt blown prior to cooling to form a multi-layer melt blown composition.

As mentioned above, in some embodiments, the hot melt processing temperature of the acid-functional (meth)acrylate-based polymeric composition is less than 200° C. and the zinc di-(meth)acrylate salt has a melting point of greater than 200° C. Typically, the hot melt processable composition mixture comprises 0.75-5.0% by weight of the total composition of zinc di-(meth)acrylate salt.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wisconsin unless otherwise noted. The following abbreviations are used: cm=centimeters; mm=millimeters; dm=decimeters; "and in=inch; RPM=revolutions per minute; g=grams; kg=kilograms; lb=pounds; N=Newtons; min=minutes; CTH=Controlled Temperature and Humidity; RH=relative humidity; psig=pounds per square inch gauge; kPa=kiloPascals; and IV=inherent viscosity.

TABLE A

Materials and their suppliers

| Material | Supplier | Appearance |
|---|---|---|
| ZnAcetate | Sigma Aldrich | Crystals |
| ZDMA (zinc dimethacrylate, trade name: DYMALINK 634) | Cray Valley USA, LLC 468 Thomas Jones Way, Suite 100 Exton, PA 19341 | White powder |
| ZDA (zinc diacrylate) | Sigma Aldrich | White powder |
| ZnO | BASF USA, 100 Park Avenue Florham Park, NJ 07932 | White powder |
| Adhesive 1 | Prepared as described in of U.S. Pat. No. 7,968,661 (Ellis et al.) with a composition of IOA/MA/AA 69/22.5/8.5 prepared according to Synthesis Example 1 below. | Viscous liquid |
| Adhesive 2 | Prepared as described in Synthesis Example S1 of US 2013/0184394 except that the composition was as follows: the pouch was filled with 94.5 IOA and 5.5 parts of AA. | Pouch |

TABLE A-continued

Materials and their suppliers

| Material | Supplier | Appearance |
|---|---|---|
| White Vinyl Film | Nominally 50 micrometers thick plasticized, white flexible and conformable vinyl (PVC, polyvinyl chloride). | White film |

Synthesis Example 1: Adhesive-1: IOA/MA/AA 69/22.5/8.5

In the first step of the polymerization, the VSP2 reactor test can was charged with 80 grams of a mixture consisting of 0.15 grams Antioxidant; 69 grams IOA; 22.5 grams MA; 8.5 grams AA; 0.52 grams of a mixture consisting of 0.10 grams Initiator-1 and 80.00 grams ethyl acetate; 1.36 grams of a mixture consisting of 1.00 gram IOTG and 16.00 grams EA; 0.42 grams of a mixture consisting of 2.00 grams MEHQ and 40.00 grams EA; 0.70 grams ABP (25% by weight in ethyl acetate). The reactor was sealed and purged of oxygen and then held at 100 psig (793 kPa) nitrogen pressure. The reaction mixture was heated to 60° C. and the reaction proceeded adiabatically. The reaction peak temperature was about 115° C. When the reaction was complete, the mixture was cooled to below 50° C. The reaction product had a solids level of 36.2% and an IV of 0.61.

To 75.00 grams of the reaction product of the first step was added 0.70 grams of a mixture consisting of 0.68 grams IOTG, 0.4 grams Initiator-1, 0.12 grams Initiator-2, 0.12 grams Peroxy-1, 0.16 grams Peroxy-2, 18.52 grams ethyl acetate; 0.49 grams ABP solution (25% by weight in ethyl acetate). The reactor was sealed and purged of oxygen and held at 100 psig (793 kPa) nitrogen pressure. The reaction mixture was heated to 60° C. and the reaction proceeded adiabatically. Reaction peak temperature was about 175° C. The final polymer had a solids level of 96.0% and an IV of 0.44.

TABLE B

Abbreviations used in Synthesis Example 1

| Abbreviation or Trade Designation | Description |
|---|---|
| Antioxidant | Antioxidant IRGANOX 1010, commercially available from Ciba Specialty Chemicals, Tarrytown, NY |
| IOA | Iso-octyl acrylate |
| MA | Methyl acrylate |
| AA | Acrylic acid |
| Initiator-1 | 2,2'-azobis(2,4 dimethylpentanenitrile), commercially available as VAZO 52 from Dupont, Wilmington, DE |
| Initiator-2 | 2,2'-azobis(cyclohexanecarbonitrile), commercially available as VAZO 88 from Dupont, Wilmington, DE |
| EA | Ethyl acetate |
| IOTG | Isooctylthioglycoate, commercially available from Dow Chemical, Midland, MI |
| MEHQ | 4-methoxy phenol |
| ABP | 4-acryloxy benzophenone, Prepared according to U.S. Pat. No. 4,737,559 |
| Peroxy-1 | 2,5-dimethyl-2,5 Di-(t-butylperoxy)hexane, commercially available as LUPERSOL 101 from Elf Atochem, Philadelphia, PA |

TABLE B-continued

Abbreviations used in Synthesis Example 1

| Abbreviation or Trade Designation | Description |
|---|---|
| Peroxy-2 | 2,5-dimethyl-2,5-Di-(t-butylperoxy)hexyne-3, commercially available as LUPERSOL 130 from Elf Atochem, Philadelphia, PA |

Test Methods a. Tan Delta measurement. The Tan delta value of the adhesives was measured on AR2000EX rheometer (made by TA Instruments Company) with oscillation frequency of 1 radian/second at defined temperature.

b. Shear holding power on stainless steel at 23 C/50% RH: Following ASTM Designation D3654/D 3654M-06 "Standard Test Methods for Shear adhesion of pressure-sensitive tapes", with exceptions as noted below. A 0.5" (1.3cm) wide and 10" long strip of sample (adhesive on 2 mil (50 micrometers) thick piece of primed vinyl film) was laminated (using a 4.5 lb hard rubber roller) onto a new cleaned (using IPA) stainless steel panel, covering a 0.5"×0.5" (1.3 cm×1.3 cm) area of the panel. The panel is then hung at about a 2° tilt from the ss vertical, to assure a shear mode failure, and the time in which the sample pulls away from the panel is measured in minutes (min). A 0.5 kg weight was used as the static load, and the test samples were placed on an automated timing apparatus in the CTH room (23° C./50% RH). The reported values represent the average value of three tests per set.

c. 90 degree peel adhesion. The specimens were kept in CTH room for 24 hours before the test. The liner is removed from adhesive sample measuring 10"×1" and laminated to a 1 mm thick standard white paint panel that had been wiped clean twice with IPA. The adhesive on film is rolled down with one pass of a 2.05 kg hard rubber roller. The panel is conditioned at room temperature (about 23° C.) for about 15 minutes then mounted on a peel tester such that the tape is pulled off at a 90° angle at a speed of 30.5 cm per minute (12 in per min). The results were measured in lbs/inch, and converted to Newtons/decimeter (N/dm). The values are an average of three tests.

Examples 1-10 and CE 1-4 preparation. Approximately 60 grams of each polymer and crosslinker (Example 1-10 and CE 1-4) was individually hotmelt-blended in a Brabender mixing bowl at 160° C. at 80 rpm for 5 minutes. Tan Delta values of these samples were measured on a TA rheometer. Composition and rheology properties of the resulting adhesive were as summarized in Table 1.

TABLE 1

| | | | | | |
|---|---|---|---|---|---|
| Samples by mixing bowl | | | | | |
| Example | Adhesive type | Crosslinker type | Crosslinker, % | Mix appearance | Tan Delta |
| Example 1 | Adhesive 1 | ZDA | 1.50% | Clear | 0.65 |
| Example 2 | Adhesive 1 | ZDA | 1.00% | Clear | 0.77 |
| Example 3 | Adhesive 1 | ZDA | 0.70% | Clear | 0.88 |
| Example 4 | Adhesive 1 | ZDMA | 1.80% | Clear | 0.50 |
| Example 5 | Adhesive 1 | ZDMA | 1.30% | Clear | 0.53 |
| Example 6 | Adhesive 1 | ZDMA | 0.90% | Clear | 0.83 |
| Example 7 | Adhesive 1 | ZDMA | 0.60% | Clear | 1.17 |
| Example 8 | Adhesive 2 | ZDMA | 0.75% | little hazy | 0.93 |
| Example 9 | Adhesive 2 | ZDMA | 1.50% | little hazy | 0.81 |
| Example 10 | Adhesive 2 | ZDMA | 3.00% | little haze | 0.70 |
| Comparative E1 | Adhesive 1 | ZnO | 0.20% | White | 1.28 |
| Comparative E2 | Adhesive 1 | ZnO | 0.30% | White | 1.12 |
| Comparative E3 | Adhesive 1 | ZnSt | 2.50% | Hazy | 1.16 |
| Comparative E4 | Adhesive 1 | ZnAcetate | 1.70% | Bubbles and inhomogeneous | 1.01 |

Example 11-16 were Made by Solution.

Solutions of the adhesive were made by mixing Adhesive 1 and crosslinker (ZDMA) at room temperature (~23° C.) for more than 24 hours. The solution was coated on a release liner at a thickness of 1.2 mils (30 micrometers). After 24 hours, the adhesive layer was laminated onto the primed side of white vinyl film 2 mils (50 micrometers) thick. After overnight, the adhesion properties were measured according to the test method described before. The composition and adhesion properties of the resulting adhesive on vinyl film were as summarized in Table 2.

TABLE 2

| | | | | | |
|---|---|---|---|---|---|
| Solution Samples | | | | | |
| Example | Adhesive 1, g | ZDMA, g | Mixed Solvent (g) (Toluene/Ethyl Acetate/ Methanol = 50/30/20) | Shear, minutes | Peel Force, Lbs/in (N/dm) |
| Example 11 | 39.6 | 0.4 | 60 | 26 | 5.1 (5.8) |
| Example 12 | 39.4 | 0.6 | 60 | 64 | 4.5 (5.1) |
| Example 13 | 39.2 | 0.8 | 60 | 137 | 3.9 (4.4) |
| Example 14 | 39.0 | 1.0 | 60 | 343 | 3.2 (3.6) |
| Example 15 | 38.8 | 1.2 | 60 | 551 | 2.9 (3.3) |
| Example 16 | 38.4 | 1.6 | 60 | 1285 | 2.2 (2.5) |

What is claimed is:

1. A hot melt processable composition mixture comprising:
    an acid-functional (meth)acrylate-based adhesive composition with a hot melt processing temperature; and
    a zinc di-(meth)acrylate salt with a melting point wherein the melting point is higher than the hot melt processing temperature of the acid-functional (meth)acrylate-based adhesive composition, wherein the mixture is hot melt processable,
    and upon application to a substrate the mixture forms an ionically crosslinked layer comprising thermally reversable ionic crosslinks.

2. The hot melt processable composition mixture of claim 1, wherein the hot melt processable composition mixture further comprises particles of thermoplastic material.

3. The hot melt processable composition mixture of claim 1, wherein the hot melt processable composition mixture further comprises at least one additive comprising tackifiers, fillers, or pigments.

4. The hot melt processable composition mixture of claim 1, wherein the acid-functional (meth)acrylate based adhesive composition comprises a copolymer comprising:
    at least one alkyl (meth)acrylate monomer; and
    at least one acid-functional co-polymerizable monomer.

5. The hot melt processable composition mixture of claim 1, wherein the hot melt processing temperature of the acid-functional (meth)acrylate-based adhesive composition is less than 200° C. and the melting point of the zinc di-(meth)acrylate salt is greater than 200° C.

6. The hot melt processable composition mixture of claim 1, wherein the zinc di-(meth)acrylate salt comprises a salt of General Formula 1:

$$[Zn^{2+}][^-O-(CO)-CR^1=CH_2]_2 \qquad \text{Formula 1}$$

wherein $R^1$ is an H or a methyl group; —(CO)— is a carbonyl group C=O.

7. The hot melt processable composition mixture of claim 1, wherein the hot melt processable composition mixture comprises 0.75-5.0% by weight of the total hot melt processable composition mixture of zinc di-(meth)acrylate salt.

8. The hot melt processable composition mixture of claim 1, wherein the hot melt processable composition mixture after crosslinking has a tan δ value of 0.8 or less when measured by a rheometer at 100° C., wherein tan δ is the tangent of the phase angle and the ratio of G"/G'.

9. A multi-layer article comprising:
    a first polymeric layer with a first major surface and a second major surface;
    a hot melt processed, ionically crosslinked adhesive layer with a first major surface and a second major surface wherein the first major surface of the adhesive layer is in contact with the second major surface of the first polymeric layer; and a second polymeric layer with a first major surface and a second major surface, wherein the first major surface of the second polymeric layer is in contact with the second major surface of the hot melt processed, ionically crosslinked adhesive layer, wherein the hot melt processed, ionically crosslinked adhesive layer comprises a hot melt processed mixture comprising:

an acid-functional (meth)acrylate-based adhesive composition with a hot melt processing temperature; and a zinc di-(meth)acrylate salt with a melting point wherein the melting point is higher than the hot melt processing temperature of the acid-functional (meth) acrylate-based adhesive composition.

10. The multi-layer article of claim 9, wherein the first polymeric layer and the second polymeric layer comprise hot melt processable layers, and wherein the multi-layer article is prepared by co-extrusion.

11. The multi-layer article of claim 9, wherein at least one of the second major surface of the first polymeric layer and the first major surface of the second polymeric layer is a release surface.

12. The multi-layer article of claim 9, wherein the acid-functional (meth)acrylate based adhesive composition comprises a copolymer comprising:

at least one alkyl (meth)acrylate monomer; and at least one acid-functional co-polymerizable monomer.

13. The multi-layer article of claim 9, wherein the hot melt processed, ionically crosslinked adhesive layer has a tan δ value of 0.8 or less when measured by a rheometer at 100° C., wherein tan δ is the tangent of the phase angle and the ratio of G"/G'.

14. A method of forming a multi-layer article comprising:

forming a hot melt processable adhesive mixture comprising:

an acid-functional (meth)acrylate-based adhesive composition with a hot melt processing temperature; and a zinc di-(meth)acrylate salt with a melting point wherein the melting point is higher than the hot melt processing temperature of the acid-functional (meth) acrylate-based adhesive composition;

hot melt mixing the hot melt processable adhesive mixture to form a flowable composition;

disposing the flowable composition onto the surface of a first film substrate. wherein the first film substrate comprises a coextruded flowable polymeric composition;

disposing a second film substrate on the surface of the adhesive composition to form a multi-layer flowable composition, wherein the second film substrate comprises a second coextruded flowable polymeric composition; and cooling the multi-layer flowable composition to room temperature to form a multi-layer article with an ionically crosslinked adhesive layer.

15. The method of claim 14, further comprising melt-blowing the multi-layer flowable composition to form a multi-layer melt-blown composition prior to cooling.

16. The method of claim 14, wherein the hot melt processing temperature of the acid-functional (meth)acrylate-based adhesive composition is less than 200° C. and the melting point of the zinc di-(meth)acrylate salt is greater than 200° ° C.

17. The method of claim 14, wherein the zinc di-(meth)acrylate salt comprises a salt of General Formula 1:

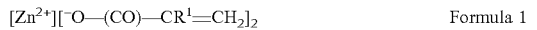

wherein $R^1$ is an H or methyl group; —(CO)— is a carbonyl group C=O.

18. The method of claim 14, wherein the hot melt processable adhesive mixture comprises 0.75-5.0% by weight of the total composition of zinc di-(meth)acrylate salt.

19. The method of claim 14, wherein the hot melt processable composition mixture after crosslinking has a tan δ value of 0.8 or less when measured by a rheometer at 100° C., wherein tan δ is the tangent of the phase angle and the ratio of G"/G'.

* * * * *